United States Patent
Spoldi et al.

(10) Patent No.: US 10,351,225 B2
(45) Date of Patent: Jul. 16, 2019

(54) POSITION HOLD OVERRIDE CONTROL

(71) Applicant: Sikorsky Aircraft Corporation, Stratford, CT (US)

(72) Inventors: Steven E. Spoldi, Shelton, CT (US); Alex Faynberg, Cheshire, CT (US); Stephen Kubik, Shelton, CT (US); Donald T. Ream, Jupiter, FL (US); John Rucci, Jupiter, FL (US); Stephen C. McCulley, Palm City, FL (US); Christiaan Corry, Jupiter, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 59 days.

(21) Appl. No.: 15/571,537

(22) PCT Filed: Mar. 4, 2016

(86) PCT No.: PCT/US2016/020914
§ 371 (c)(1),
(2) Date: Nov. 3, 2017

(87) PCT Pub. No.: WO2016/178738
PCT Pub. Date: Nov. 10, 2016

(65) Prior Publication Data
US 2018/0141642 A1    May 24, 2018

Related U.S. Application Data

(60) Provisional application No. 62/156,971, filed on May 5, 2015.

(51) Int. Cl.
*B64C 13/00* (2006.01)
*B64C 13/18* (2006.01)
(Continued)

(52) U.S. Cl.
CPC ............. *B64C 13/18* (2013.01); *B64C 13/22* (2013.01); *B64C 13/503* (2013.01);
(Continued)

(58) Field of Classification Search
None
See application file for complete search history.

(56) References Cited

U.S. PATENT DOCUMENTS 3,497,879 A    3/1970  Venaleck
3,848,833 A    11/1974 Rauschelbach
(Continued)

OTHER PUBLICATIONS

Notification of Transmittal of the International Search Report for International Application No. PCT/US2016/020914 dated Apr. 28, 2016; dated May 20, 2016; 7 pages.

(Continued)

*Primary Examiner* — Jonathan M Dager
(74) *Attorney, Agent, or Firm* — Cantor Colburn LLP

(57) ABSTRACT

A method for position hold override control of an aircraft includes determining, by a processor, that a position hold mode is enabled to hold the aircraft at a substantially fixed position with respect to a target. The processor receives a control input indicative of a commanded change in acceleration of the aircraft as an override of the position hold mode. The processor determines an acceleration command based on the commanded change in acceleration. The acceleration command is adjusted as an adjusted acceleration command responsive to a non-linear scheduled translational rate command based on feedback of a commanded velocity of the aircraft. An update to the commanded velocity of the aircraft is generated based on the adjusted acceleration command.

15 Claims, 6 Drawing Sheets

(51) Int. Cl.
*B64C 13/22* (2006.01)
*B64C 13/50* (2006.01)
*G05D 1/00* (2006.01)
*G05D 1/08* (2006.01)

(52) U.S. Cl.
CPC ......... *G05D 1/0061* (2013.01); *G05D 1/0808* (2013.01); *G05D 1/0858* (2013.01)

(56) References Cited

U.S. PATENT DOCUMENTS

| | | | |
|---|---|---|---|
| 4,043,526 A | | 8/1977 | Donley et al. |
| 4,382,283 A | | 5/1983 | Clelford et al. |
| 4,645,141 A | | 2/1987 | McElreath |
| 5,029,778 A | | 7/1991 | Deluca |
| 5,195,039 A | * | 3/1993 | Gold ................. B64C 27/57 244/17.13 |
| 5,195,700 A | | 3/1993 | Fogler, Jr. et al. |
| 6,629,023 B1 | * | 9/2003 | Silder, Jr. ............ G05D 1/0676 244/114 R |
| 7,930,074 B2 | * | 4/2011 | Cherepinsky ........ G05D 1/0858 701/12 |
| 8,688,295 B2 | | 4/2014 | Ellis et al. |
| 9,004,394 B2 | * | 4/2015 | van der Westhuizen .................... B64C 27/72 244/17.11 |
| 2002/0077743 A1 | | 6/2002 | Schmidt |
| 2008/0077284 A1 | * | 3/2008 | Swope ................. G05D 1/101 701/5 |
| 2008/0097658 A1 | * | 4/2008 | Shue ................... G05D 1/101 701/8 |
| 2008/0249672 A1 | * | 10/2008 | Cherepinsky ........ G05D 1/0858 701/7 |
| 2012/0153074 A1 | * | 6/2012 | Nannoni ................. B64C 27/57 244/17.13 |
| 2012/0253561 A1 | * | 10/2012 | Ellis ..................... G05D 1/0858 701/3 |
| 2013/0138270 A1 | * | 5/2013 | Christensen ........... G05D 1/102 701/3 |
| 2013/0274963 A1 | * | 10/2013 | Shue ....................... B64C 19/00 701/3 |
| 2014/0021303 A1 | * | 1/2014 | Salamat ................ B64C 13/04 244/231 |
| 2015/0286214 A1 | * | 10/2015 | Litwinowicz ........ G08G 5/0021 701/3 |
| 2015/0291277 A1 | * | 10/2015 | Kubik .................... G05D 1/102 701/3 |
| 2015/0344134 A1 | * | 12/2015 | Cruz Ayoroa ...... B64C 29/0033 244/48 |
| 2016/0001881 A1 | * | 1/2016 | van der Westhuizen .................... B64C 27/18 244/17.11 |
| 2017/0278403 A1 | * | 9/2017 | Pitcher .................. G01S 17/933 |
| 2018/0170524 A1 | * | 6/2018 | Blanc ................. B64C 13/0421 |
| 2018/0251207 A1 | * | 9/2018 | Kim ..................... B64C 13/503 |
| 2018/0284778 A1 | * | 10/2018 | Worsham, II ........ G05D 1/0202 |
| 2019/0004542 A1 | * | 1/2019 | Kim ..................... G05D 1/0858 |
| 2019/0039720 A1 | * | 2/2019 | Worsham, II ........ G05D 1/0676 |

OTHER PUBLICATIONS

Written Opinion of the International Searching Authority for International Application No. PCT/US2016/020914 dated Apr. 28, 2016; dated May 20, 2016; 5 pages.

* cited by examiner

POSITION HOLD OVERRIDE CONTROL

CROSS REFERENCE TO RELATED APPLICATIONS

This application is a National Stage application of PCT/US2016/020914, filed Mar. 4, 2016, which claims the benefit of U.S. Provisional Application No. 62/156,971, filed May 5, 2015, both of which are incorporated by reference in their entirety herein.

STATEMENT REGARDING FEDERALLY SPONSORED RESEARCH OR DEVELOPMENT

This invention was made with Government support with the United States Navy under Contract No. N00019-06-C-0081. The Government therefore has certain rights in this invention.

BACKGROUND

The subject matter disclosed herein relates generally to the field of control systems in aircraft and, in particular, to an advanced control law that utilizes a fly-by-wire system to implement a position hold override control for an aircraft.

Many aircraft, including helicopters, use an onboard fly-by-wire (FBW) system to control vehicle operation. Emerging FBW helicopters provide high levels of augmentation. These FBW systems greatly reduce pilot workload and enhance safety. Part of the safety enhancements includes control inputs that allow pilots to aggressively maneuver within the airframe structural limits and not exceed these limits. Within these flight control systems, it is possible for the pilot to engage a deceleration mode whereby the flight control system follows an automated linear deceleration profile in order to automatically decelerate to a specific location. However, in typical aircraft, a pilot may not be able to augment the automated linear deceleration profile once initiated. This often results in the helicopter overshooting the specific location by flying a very controlled approach to a wrong location. Once a position hold is established at a target location, repositioning the aircraft can be cumbersome. Further, automated pilot assistance features are typically constrained to a substantially low operating speed range, e.g., five knots or less.

BRIEF SUMMARY

According to an embodiment, a method for position hold override control of an aircraft includes determining, by a processor, that a position hold mode is enabled to hold the aircraft at a substantially fixed position with respect to a target. The processor receives a control input indicative of a commanded change in acceleration of the aircraft as an override of the position hold mode. The processor determines an acceleration command based on the commanded change in acceleration. The acceleration command is adjusted as an adjusted acceleration command responsive to a non-linear scheduled translational rate command based on feedback of a commanded velocity of the aircraft. An update to the commanded velocity of the aircraft is generated based on the adjusted acceleration command.

In addition to one or more of the features described above or below, or as an alternative, further embodiments could include where the acceleration command is a deceleration command to one or more of a longitudinal or a lateral control of the aircraft.

In addition to one or more of the features described above or below, or as an alternative, further embodiments could include where an altitude of the aircraft is held substantially constant while adjusting the acceleration of the aircraft using the override of the position control.

In addition to one or more of the features described above or below, or as an alternative, further embodiments could include where the non-linear scheduled translational rate command is based on a lookup table that relates a non-linear aircraft deceleration schedule with groundspeed of the aircraft.

In addition to one or more of the features described above or below, or as an alternative, further embodiments could include reengaging the position hold mode based on determining that the aircraft has decelerated below a velocity threshold.

In addition to one or more of the features described above or below, or as an alternative, further embodiments could include where the target is a moving target, and the feedback of the commanded velocity of the aircraft is adjusted based on a target velocity.

In addition to one or more of the features described above or below, or as an alternative, further embodiments could include where the control input is received from a stick input, and the processor determines the update to the commanded velocity based on integration of the adjusted acceleration command.

In addition to one or more of the features described above or below, or as an alternative, further embodiments could include where the non-linear scheduled translational rate command is shaped to provide an initially more rapid change in one direction followed by a reduced rate of change in an opposite direction in the commanded velocity of the aircraft in response to a step function change in the control input.

According to another embodiment, a system for position hold override control of an aircraft includes a propulsion system of the aircraft; a processor; and memory having instructions stored thereon that, when executed by the processor, cause the system to: determine that a position hold mode is enabled to hold the aircraft at a substantially fixed position with respect to a target. A control input is received indicative of a commanded change in acceleration of the aircraft as an override of the position hold mode. An acceleration command is determined based on the commanded change in acceleration. The acceleration command is adjusted as an adjusted acceleration command responsive to a non-linear scheduled translational rate command based on feedback of a commanded velocity of the aircraft. An update to the commanded velocity of the aircraft is generated for the propulsion system based on the adjusted acceleration command.

Other aspects, features and techniques of the present disclosure will become more apparent from the following description taken in conjunction with the drawings.

BRIEF DESCRIPTION OF THE SEVERAL VIEWS OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

A position hold override control mode of an aircraft includes an attitude (i.e., acceleration) command control system with a non-linear scheduled vehicle translational rate feedback system. The feedback system provides a translational rate command response that is adaptable as a function of velocity, allowing an arbitrary acceleration/deceleration profile while maintaining predictable and consistent short term control characteristics. Typical linear translational rate command systems for aircraft, such as rotorcraft, have conflicting requirements of minimum control bandwidth and maximum acceleration/deceleration attitude transient response. Embodiments provide a non-linear scheduled velocity feedback to an attitude command control system that maintains a high bandwidth control response while extending a maximum allowable speed to an arbitrary velocity limit, e.g., an order of magnitude increase.

Figure 1:
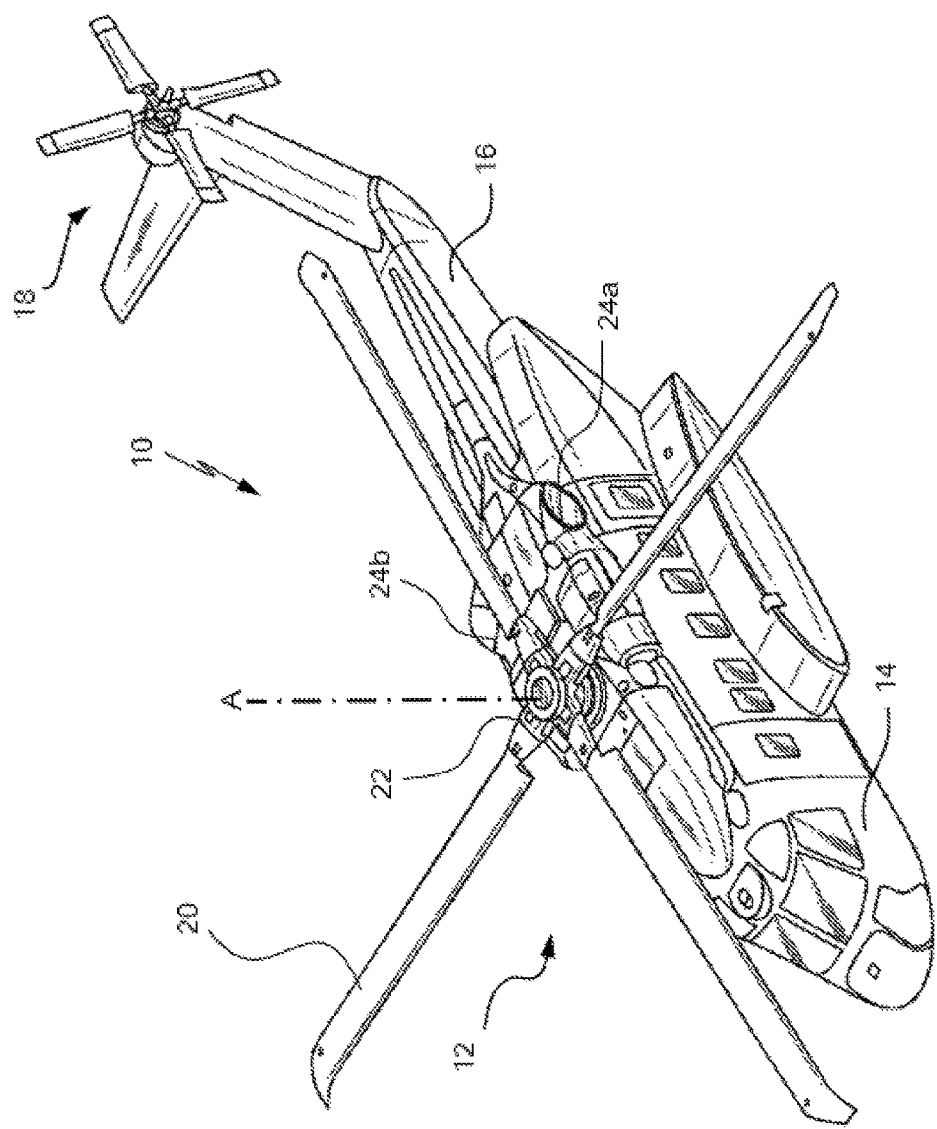
FIG. 1 is a perspective view of an example rotary wing aircraft for use with embodiments.

Referring to the drawings, FIG. 1 schematically illustrates a rotary wing aircraft 10 which includes an augmented flight control system according to an embodiment. The aircraft 10 includes an airframe 14 having a main rotor assembly 12 and an extending tail 16 which mounts a tail rotor system 18, such as an anti-torque system, a translational thrust system, a pusher propeller, a rotor propulsion system and the like. The main rotor assembly 12 includes a plurality of rotor blades 20 mounted to a rotor hub 22. The main rotor assembly 12 is an example of a propulsion system of the aircraft 10 driven about an axis of rotation A through a main rotor gearbox (not shown) by a power plant system, here shown as two internal combustion engines 24a-24b. Although a particular helicopter configuration is illustrated and described herein, other configurations and/or machines, such as high-speed compound rotary wing aircraft with supplemental translational thrust systems, dual contra-rotating, coaxial rotor system aircraft, turbo-props, thrust vectoring aircraft, tilt-rotors and tilt-wing aircraft, will also benefit from embodiments of the present disclosure.

Figure 2:
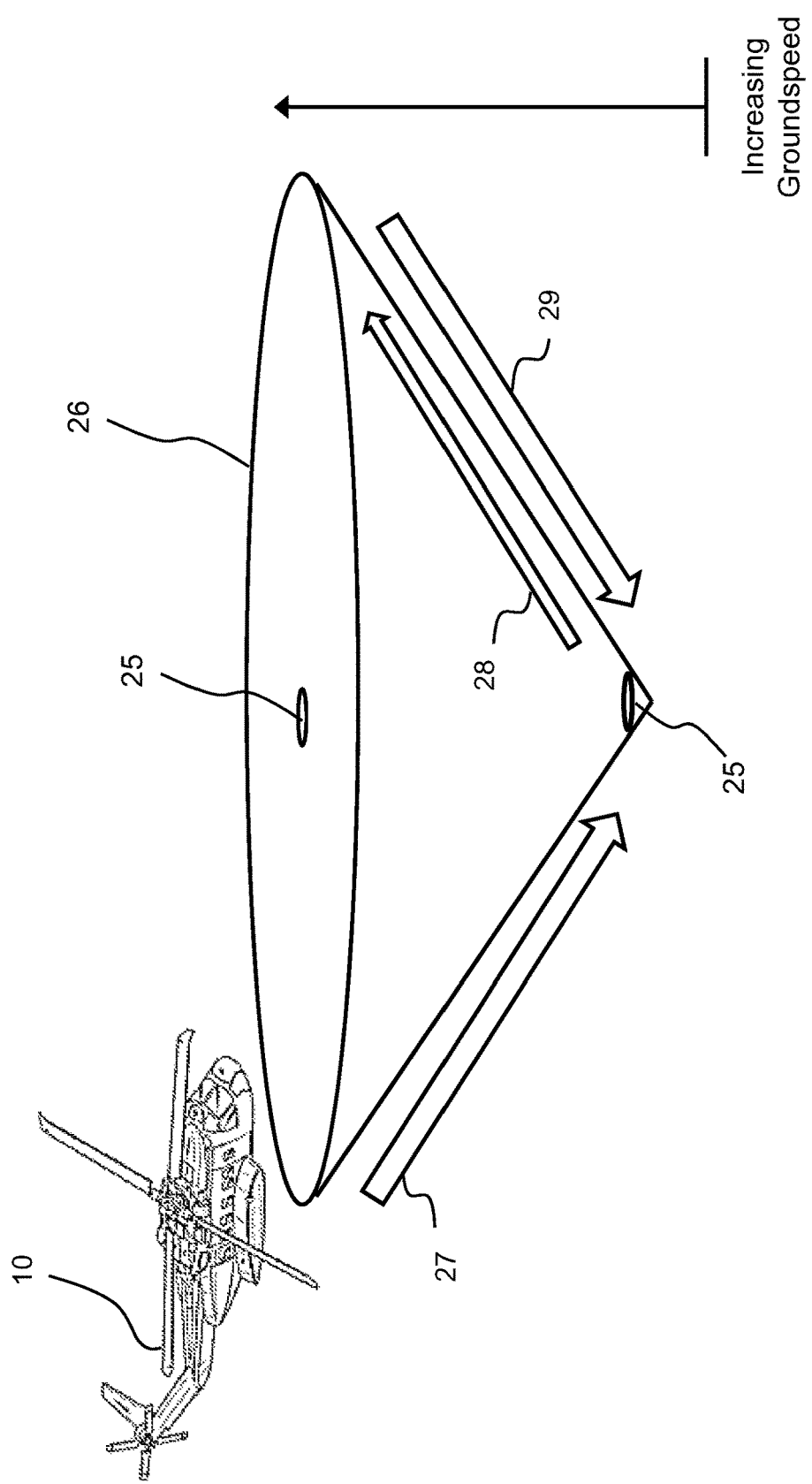
FIG. 2 depicts an example of mode transitions related to a position hold for a rotary wing aircraft.

FIG. 2 depicts an example of mode transitions related to a position hold for aircraft 10. In the example of FIG. 2, the aircraft 10 approaches a target 25 in an approach region 26. As the aircraft 10 approaches target 25, a deceleration-to-hover mode of operation can be engaged that drives lateral and longitudinal groundspeed to about zero knots during an automated deceleration 27. Upon the aircraft 10 reaching a velocity below a velocity threshold, the aircraft 10 can transition into a position hold mode whereby the pilot stick is retained in detent. In exemplary embodiments, should the pilot desire to reposition the aircraft 10 by overriding the position hold mode, the pilot can move the stick out of detent to command repositioning with a translational rate command equivalent response, such as increasing groundspeed away 28 from the target 25. The pilot may adjust targeting coordinates of the target 25 and continue with the position hold override to decelerate 29 back to the target 25, where the stick in detent drives to about zero knots groundspeed to allow reengagement of the position hold mode below a velocity threshold. Thus, the aircraft 10 can transition from a deceleration-to-hover mode with a position hold mode armed as a next mode to be engaged, and after achieving a position hold, the aircraft 10 can be maneuvered away from target 25 and enter deceleration-to-hover mode again with pilot stick inputs active as an override to position hold until a position hold is again achieved. It should be noted that in FIG. 2, the aircraft 10 can remain at substantially the same altitude during repositioning using, for instance, a radar altitude hold of collective control.

Figure 3:
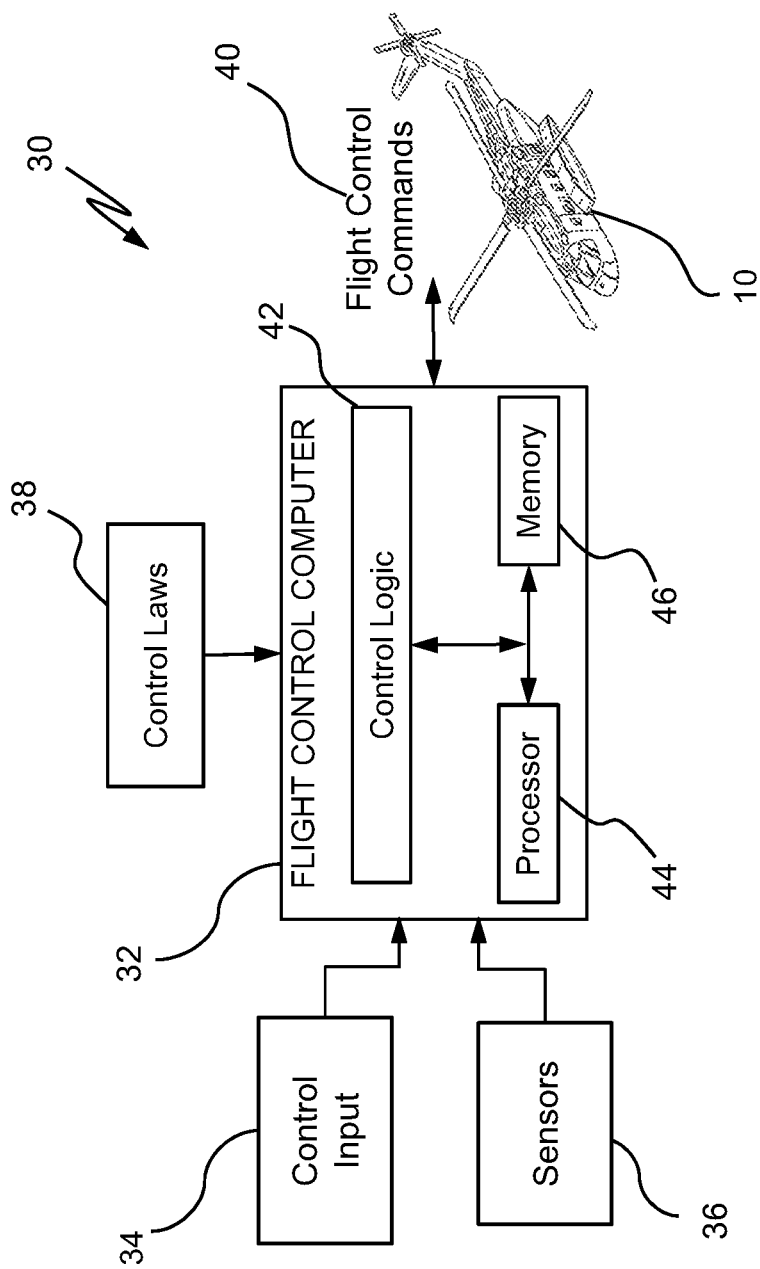
FIG. 3 is a schematic block diagram of an embodiment of a control system for a rotary wing aircraft.

FIG. 3 illustrates an example of a flight control system 30 of aircraft 10 that utilizes a model following control system that receives, in an embodiment, control input 34 via cyclic and/or collective sticks in order to adjust or augment a pre-programmed or stored acceleration adjustment profile. The pre-programmed acceleration adjustment profile facilitates position hold override control of the aircraft 10. The control system 30 may be, in embodiments, a full authority or a limited authority flight control system which provides feed-forward and feedback paths to achieve the desired response characteristics. The control system 30 implements a control logic 42 that augments the pre-programmed acceleration adjustment profile and provides attitude commands for controlling the cyclic and/or collective pitch when the stick is moved out of detent. Moving the stick out of detent controls the swashplate angle and holds the swashplate in that position until the stick is released upon which position hold mode or another mode is re-initiated. The control system 30 provides an architecture that can be used to provide a non-linear translational rate command response, where controller deflection correlates to steady state velocity. In this instance, an adjusted acceleration command is scheduled to grow as a function of total groundspeed speed to control a commanded velocity of the aircraft 10. While acceleration and deceleration commands are referenced throughout this disclosure, it is to be appreciated that reference to acceleration commands can include positive acceleration as well as negative acceleration (or deceleration).

A schematic of a control system 30 to accomplish this is illustrated in FIG. 3. Pilot commands from control input 34 such as, for example, a cyclic stick and/or foot pedals are received by a flight control computer 32 as a commanded acceleration or deceleration for trim attitude changes. A number of sensors 36 are provided in order to sense flight conditions of aircraft 10 such as, in some non-limiting examples, longitudinal velocity, lateral velocity, airspeed, measured thrust, measured torque or the like. Data from sensors 36 are directed to flight control computer 32 operably connected to sensors 36 where they are compared to control laws 38 and a look-up table with notional estimated values of a relationship between attitude and acceleration. Flight control computer 32 communicates flight control commands 40 as acceleration and deceleration command signals, e.g., lateral and longitudinal control commands for aircraft 10. In embodiments, flight control commands 40 may be estimated from aircraft parameters or determined according to a schedule of attitude to acceleration as a function of sensed longitudinal velocity of aircraft 10, sensed lateral velocity of aircraft 10 or the like.

In an embodiment, flight control computer 32 includes a memory 46. Memory 46 stores the control logic 42 as executable instructions that is executed by a processor 44. The instructions may be stored or organized in any manner and at any level of abstraction, such as in connection with the execution of the control logic 42. Processor 44 may be any type of processor (CPU), including a general purpose processor, a digital signal processor, a microcontroller, an application specific integrated circuit, a field programmable gate array or the like. Also, in embodiments, memory 46 may include random access memory (RAM), read only memory (ROM), or other electronic, optical, magnetic or any other computer readable medium onto which is stored control logic 42 described below.

Figure 4:
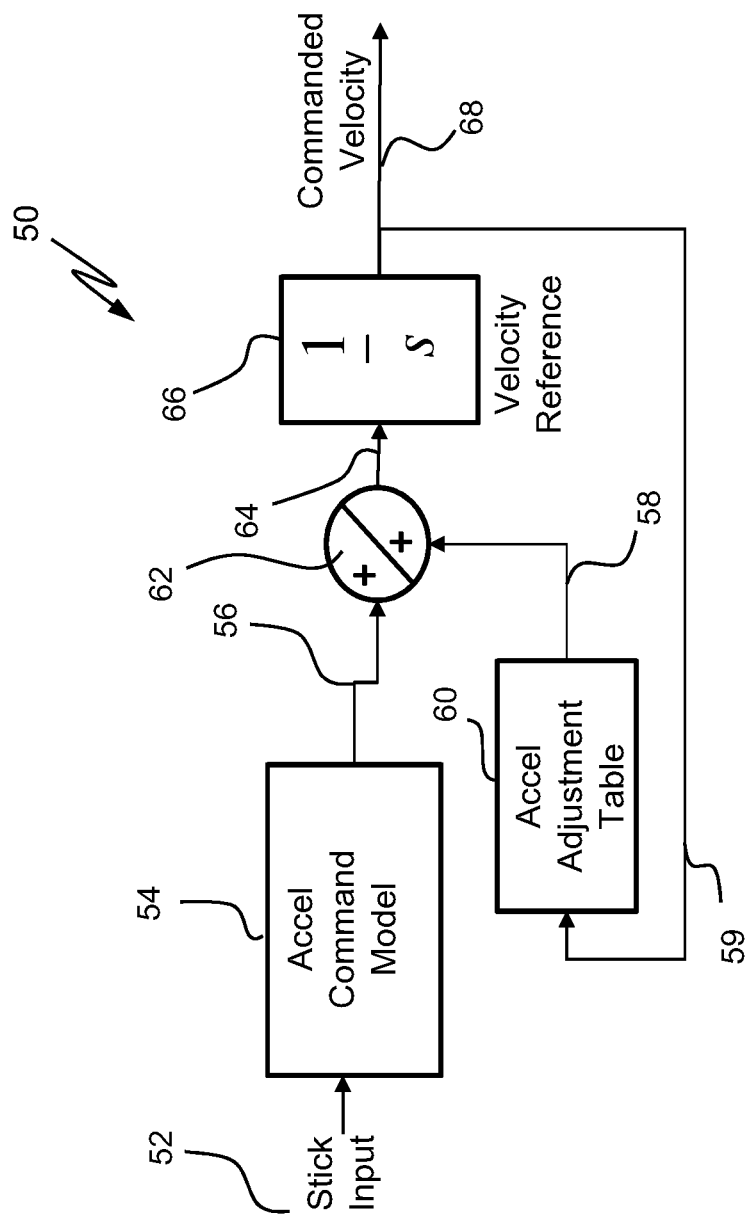
FIG. 4 is a schematic block diagram of a control loop according to an embodiment.

FIG. 4 illustrates a schematic view of a control loop 50 as part of control logic 42 of flight control computer 32. Initially, signals 52 from a control input such as, for example, a cyclic stick and/or a collective stick are received by an acceleration command model 54. A pilot for aircraft 10 can perturb the system by commanding delta acceleration from a trim schedule. This allows the pilot to increase or decrease a scheduled acceleration/deceleration through pilot sticks, giving them the ability to manipulate the final destination. As a non-limiting example, signals 52 are received by control system 30 that represent pilot stick inputs to aircraft 10. Pilot stick inputs are interpreted by acceleration command model 54 as trim attitude changes and are converted into additive acceleration or deceleration command signals 56 which are subsequently integrated into reference velocities in integrator block 66. Signal 56 is an acceleration command that represents a pilot commanded delta acceleration command. Signal 59 represents a reference velocity feedback from the acceleration integrator block 66 that is received by an acceleration adjustment table 60. Acceleration adjustment table 60 may be a lookup table that relates a non-linear aircraft deceleration schedule with groundspeed of the aircraft 10 and outputs one or more signals 58 representing scheduled acceleration commands that are provided to a summation block 62. A signal 64 for a total value between signal 56 (an acceleration command) and signal 58 (a non-linear scheduled translational rate command) is determined in summation block 62 as an adjusted acceleration command. Signal 64 is fed to integrator block 66 that integrates the input over time for determination of a commanded velocity 68. Commanded velocity 68 represents commands that are also provided as feedback signals for command of rotor 12 (FIG. 1) for, in an embodiment, modulating an automated deceleration profile and hand-flying the aircraft 10 to a hover at a desired final location, for instance, as an override of a position hold. The control loop 50 provides an architecture that is attitude independent with the output of the acceleration command model 54 and the acceleration adjustment table 60 summing to total acceleration. The structure provides commanded accelerations and commanded velocities such that the quantities can be controlled via feedback loop closures to determine the appropriate pitch and roll trim attitudes.

Figure 5:
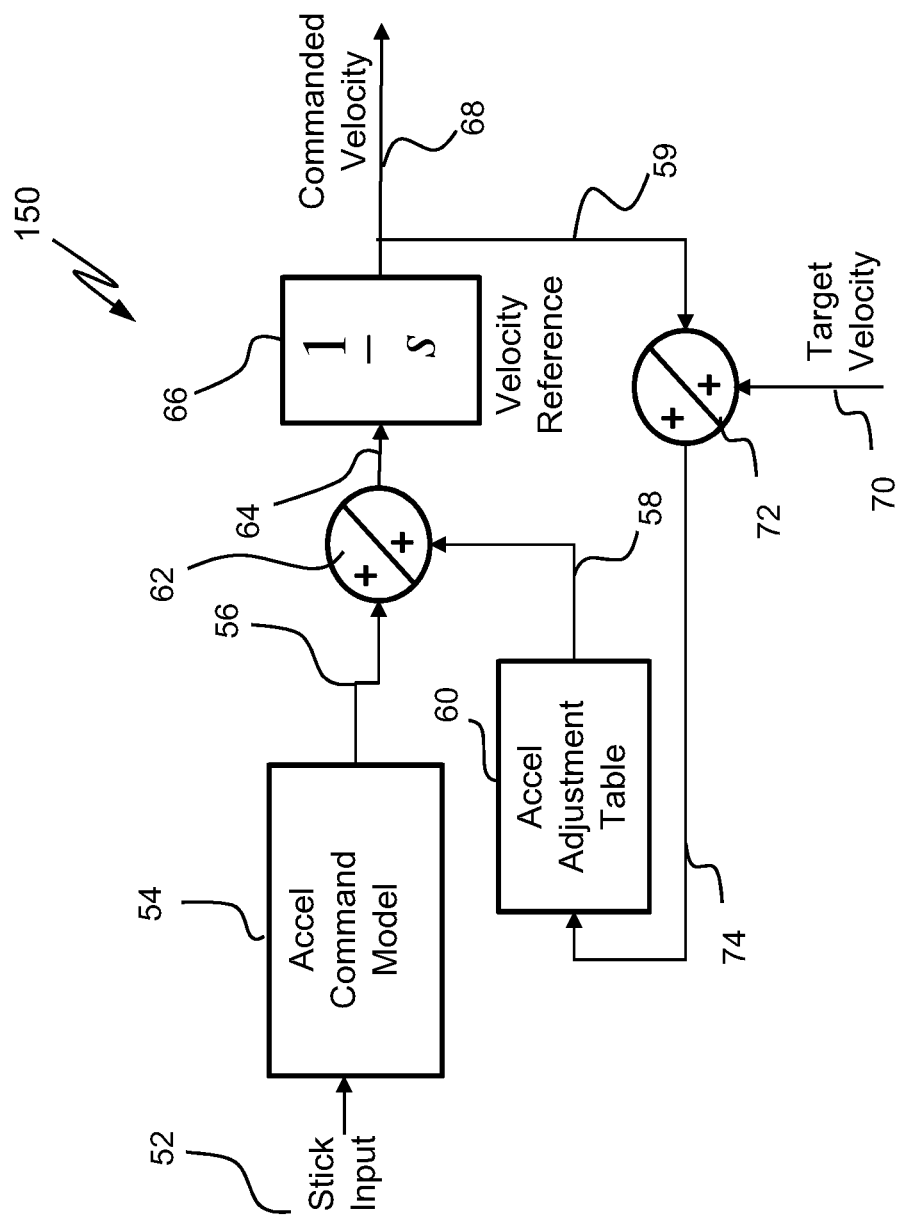
FIG. 5 is a schematic block diagram of a control loop according to an embodiment.

FIG. 5 illustrates a schematic view of a control loop 150 as part of control logic 42 of flight control computer 32 according to an alternate embodiment. Similar to the control loop 50 of FIG. 4, control loop 150 receives signals 52 from a control input, such as pilot stick input at acceleration command model 54. Summation block 62 computes signal 64 based on signal 56 output from the acceleration command model 54 and signal 58 output from acceleration adjustment table 60. Integrator block 66 integrates signal 64 to produce commanded velocity 68. Rather than sending signal 59 as reference velocity feedback directly to the acceleration adjustment table 60, signal 59 is summed with a target velocity 70 at summation block 72 to produce a target adjusted velocity reference 74 as an index into the acceleration adjustment table 60. The control loop 150 may be used where target 25 of FIG. 2 is a moving target that shifts in position, for instance, a moving ship. Incorporating the target velocity 70 into the control loop 150 can enable similar control system response from a pilot perspective regardless of whether the target 25 is in motion or remains in a substantially fixed position.

With respect to FIGS. 1-5, when implemented in control logic 42, the control loop 50 and/or the control loop 150 can generate commanded velocity 68 as flight control commands 40 for lateral and longitudinal control of aircraft 10. A processor of the flight control computer 32 may determine that a position hold mode is enabled to hold the aircraft 10 at a substantially fixed position with respect to a target 25. The processor of the flight control computer 32 can receive control input 34 indicative of a commanded change in acceleration of the aircraft 10 as an override of the position hold mode. The processor of the flight control computer 32 can determine an acceleration command (e.g., signal 56) based on the commanded change in acceleration from signal 52. The acceleration command is adjusted as an adjusted acceleration command (e.g., signal 64) responsive to a non-linear scheduled translational rate command (e.g., signal 58) based on feedback of a commanded velocity 68 of the aircraft 10. An update to the commanded velocity 68 of the aircraft 10 is generated based on the adjusted acceleration command, for instance, on a next iteration of the integrator block 66 that produces an integration of the adjusted acceleration command.

Figure 6:
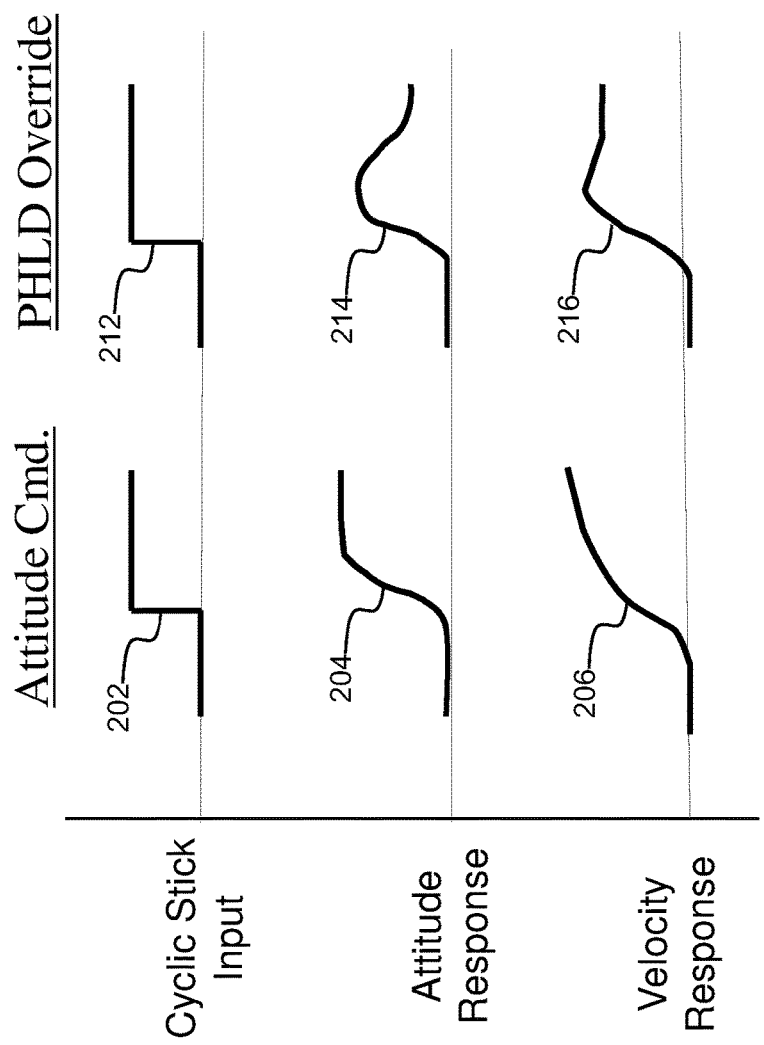
FIG. 6 depicts step function response examples according to an embodiment.

FIG. 6 depicts step function response examples according to an embodiment. A cyclic stick input may appear as an abrupt step function change in an attitude command 202 and is observed as a step function 212 by a position hold override control, such as control loop 50 of FIG. 4 or control loop 150 of FIG. 5. Without position hold override control, a resulting attitude response 204 and velocity response 206 increases rapidly and flattens out at an upper limit. In contrast, a non-linear scheduled translational rate command produced by the acceleration adjustment table 60 of FIGS. 4 and 5 can be shaped to provide an initially more rapid change in one direction followed by a reduced rate of change in an opposite direction in attitude response 214 and velocity response 216 of the aircraft 10 in response to the step function 212 change in control input. This results in a reduction of acceleration and a reduced velocity response to maintain responsiveness and consistency of control characteristics over a wide range of groundspeeds.

The terminology used herein is for the purpose of describing particular embodiments only and is not intended to be limiting. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate in spirit and/or scope. Additionally, while various embodiments have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method for position hold override control of an aircraft, comprising:
   determining, by a processor, that a position hold mode is enabled to hold the aircraft at a substantially fixed position with respect to a target;

receiving, by the processor, a control input indicative of a commanded change in acceleration of the aircraft as an override of the position hold mode;

determining, by the processor, an acceleration command based on the commanded change in acceleration;

adjusting the acceleration command as an adjusted acceleration command responsive to a non-linear scheduled translational rate command based on feedback of a commanded velocity of the aircraft; and generating an update to the commanded velocity of the aircraft based on the adjusted acceleration command.

2. The method of claim 1, wherein the acceleration command is a deceleration command to one or more of a longitudinal or a lateral control of the aircraft.

3. The method of claim 1, wherein an altitude of the aircraft is held substantially constant while adjusting the acceleration of the aircraft using the override of the position control.

4. The method of claim 1, wherein the non-linear scheduled translational rate command is based on a lookup table that relates a non-linear aircraft deceleration schedule with groundspeed of the aircraft.

5. The method of claim 1, further comprising reengaging the position hold mode based on determining that the aircraft has decelerated below a velocity threshold.

6. The method of claim 1, wherein the target is a moving target, and the feedback of the commanded velocity of the aircraft is adjusted based on a target velocity.

7. The method of claim 1, wherein the control input is received from a stick input, and the processor determines the update to the commanded velocity based on integration of the adjusted acceleration command.

8. The method of claim 1, wherein the non-linear scheduled translational rate command is shaped to provide an initially more rapid change in one direction followed by a reduced rate of change in an opposite direction in the commanded velocity of the aircraft in response to a step function change in the control input.

9. A system for position hold override control of an aircraft, the system comprising: a propulsion system of the aircraft;

a processor; and memory having instructions stored thereon that, when executed by the processor, cause the system to:

determine that a position hold mode is enabled to hold the aircraft at a substantially fixed position with respect to a target;

receive a control input indicative of a commanded change in acceleration of the aircraft as an override of the position hold mode;

determine an acceleration command based on the commanded change in acceleration;

adjust the acceleration command as an adjusted acceleration command responsive to a non-linear scheduled translational rate command based on feedback of a commanded velocity of the aircraft; and generate an update to the commanded velocity of the aircraft for the propulsion system based on the adjusted acceleration command.

10. The system of claim 9, wherein the acceleration command is a deceleration command to one or more of a longitudinal or a lateral control of the aircraft.

11. The system of claim 9, wherein an altitude of the aircraft is held substantially constant while adjusting the acceleration of the aircraft using the override of the position control.

12. The system of claim 9, wherein the non-linear scheduled translational rate command is based on a lookup table that relates a non-linear aircraft deceleration schedule with groundspeed of the aircraft.

13. The system of claim 9, wherein the processor is configured to reengage the position hold mode based on determining that the aircraft has decelerated below a velocity threshold.

14. The system of claim 9, wherein the target is a moving target, and the feedback of the commanded velocity of the aircraft is adjusted based on a target velocity.

15. The system of claim 9, wherein the non-linear scheduled translational rate command is shaped to provide an initially more rapid change in one direction followed by a reduced rate of change in an opposite direction in the commanded velocity of the aircraft in response to a step function change in the control input.

* * * * *